Oct. 22, 1929.  F. WILSON, SR  1,732,825
DIVIDED AXLE
Filed Dec. 27, 1926
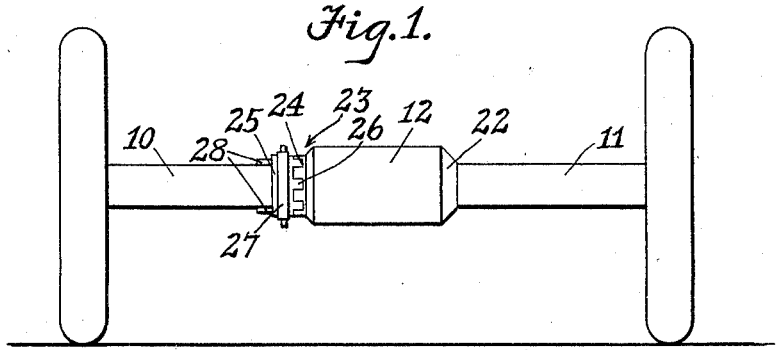
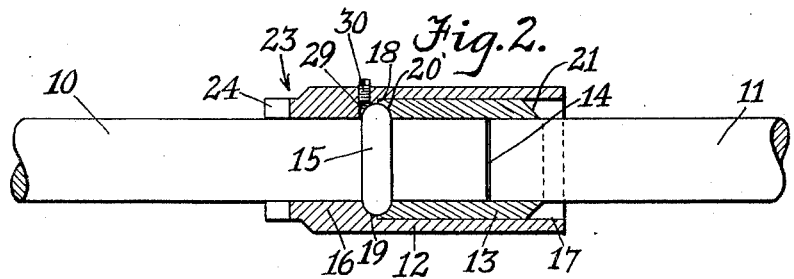
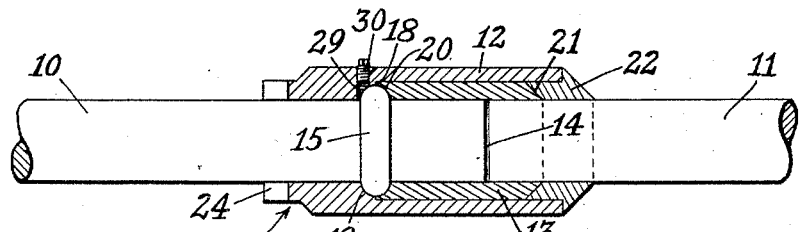
INVENTOR,
Fank Wilson Sr.
BY
ATTORNEY.

Patented Oct. 22, 1929

1,732,825

UNITED STATES PATENT OFFICE

FRANK WILSON, SR., OF LOS ANGELES, CALIFORNIA, ASSIGNOR TO ANNIE WILSON REBOUL, OF LOS ANGELES, CALIFORNIA

DIVIDED AXLE

Application filed December 27, 1926. Serial No. 157,173.

My invention relates to live axles such as are used on railway cars, motor vehicles and the like.

The live axle or driving axle of motor vehicles is usually made in two parts which are equipped with gear wheels meshing with pinions on the drive shaft in such a manner as to permit the two wheels on opposite ends of the axle to turn independently or at different rates of speed while going around a curve. The system of bevel wheels, clutches, etc., employed for this purpose is known as the differential gearing.

The primary object of my invention is to provide a live axle or driving axle, suitable for railway cars or motor vehicles, which permits such independent action of the two wheels fixed thereon without the expensive and often troublesome differential gearing in general use.

A further object is to provide a divided axle of the character described which is extremely simple in construction, which is strong and durable enough to be thoroughly reliable and which readily may be adapted to different uses.

Other objects and advantages will appear hereinafter and while I show herewith and will describe a preferred form of construction, I desire it to be understood that I do not limit my invention to such preferred form but that various changes and adaptations may be made therein without departing from the spirit of my invention as hereinafter claimed.

Referring to the drawings which accompany this specification and form a part thereof.

Fig. 1 is a rear side view of a divided axle embodying the features of my invention, having a wheel of the automobile type fixed on each end thereof.

Fig. 2 is an enlarged fragmentary view of the axle shown in Fig. 1, middle parts of which are indicated in section to show the method of construction.

Fig. 3 is a view similar to Fig. 2, showing the axle in its finished condition.

The axle consists of two pieces of shafting 10 and 11, of equal diameter, set end to end and held in axial alignment with each other by an outer sleeve 12 and an inner sleeve 13, both of which overlap the meeting ends at 14. Part 10 is equipped with an annular ridge or bead 15, which may be semi-circular as shown or rectangular in cross-section, in spaced relation to its inner end, while part 11 is of uniform diameter throughout its length.

Outer sleeve 12 is of such a length as not only to overlap the meeting ends at 14 but also to extend beyond bead 15, as at 16, and the bore of this end 16 is made to conform to the diameter of axle part 10 closely enough to permit the latter to turn freely in the former. The bore of the opposite end of outer sleeve 12 is enlarged, as at 17, to a point coinciding with the middle of annular bead 15, the diameter of the enlarged bore being sufficiently greater than that of the bead to provide an annular shoulder 18 within outer sleeve 12. The inner corner of the shoulder is cut away as at 19 to conform to one side of bead 15.

Inner sleeve 13 is made somewhat shorter than that part of outer sleeve 12 which has the enlarged bore with an outer diameter conforming to the enlarged bore, so that it fits snugly within the outer sleeve, and with an inner diameter conforming to that of the shaft parts 10 and 11. The inner corner of the inner end of sleeve 13 is cut away, as at 20, to conform to the other side of bead 15 so that when the inner end of inner sleeve 13 butts against shoulder 18, as shown in Figs. 2 and 3, the complementary grooves 19 and 20, in sleeves 12 and 13 respectively cooperate to form an annular groove, conforming to bead 15, in which it may freely turn. The outer end of inner sleeve 13 is tapered as at 21.

The axle, as a whole, is assembled by inserting the longer end of axle-part 10 into the enlarged bore of outer sleeve 12 and passing it through the reduced bore in the opposite end 16 thereof until bead 15 comes into engagement with groove 19. Inner sleeve 13 is then forced into the enlarged bore of outer sleeve 12 until its inner end butts against shoulder 18 whereupon the parts are heated and fused metal is run into the open end of sleeve 12, around the tapered end 21 of inner sleeve 13 and around the inner end of part 11 of the axle. When the metal solidifies a rigid seal 22 is produced which binds outer sleeve 12 and inner sleeve 13 together and fuses them to axle part 11 as if they were welded thereto and all three were of a single solid piece. It is evident that the two axle-parts 10 and 11, by this construction, are firmly held together and that each part may turn freely and independently of the other, without any possibility of trouble as from stripping of gears and the like.

In case it is desired to provide for locking the two parts of the axle together, for more effective driving straight ahead, end 16 of outer sleeve 12 may be reduced as at 23 and notches 24 cut therein, before the parts are assembled, to form one element of a clutch. A sliding collar 25 with corresponding teeth 26 and the usual slip ring 27 may then be mounted on part 10 of the axle, adjacent the notched end of sleeve 12, feather keys 28 being fixed in the axle in the usual way to prevent turning of the collar thereon. When it is to be used as a driving axle, a drive gear (not shown) may be mounted on outer sleeve 12 and keyed thereto.

An oil hole 29, with a grease-cup or plug 30, may be provided in sleeve 12 to keep the parts properly lubricated.

Having thus illustrated and described my invention, I claim:

1. A divided axle for cars and motor vehicles, comprising two axially aligned shaft parts having inner end portions which meet, an inner sleeve fitting over both of said end portions, a longer outer sleeve telescoping over said inner sleeve, means at one side of the meeting point of said shaft parts to prevent the shaft part at that side from being withdrawn from said sleeves, and a body of metal fused to the other of said shaft parts and to adjacent end portions of both of said sleeves so as to form a bearing in which said shaft parts may turn with relation to each other.

2. A divided axle for cars, motor vehicles and the like, comprising two axially aligned shaft parts, an annular bead on one of said shaft parts, an outer and inner sleeve telescoped over the other of said shaft parts, said outer and inner sleeves overlapping the meeting ends of said shaft parts, the outer sleeve having a thickened portion which conforms to the diameter of the shaft part contained therewithin, the adjacent end of said inner sleeve co-operating with said thickened portion to form an annular groove which conforms to said bead on one of the shaft parts, and a body of metal fused to said sleeves and to the shaft part which co-operates with the beaded shaft part.

3. A divided axle for cars, motor vehicles and the like, comprising two axially aligned shaft parts; an annular bead on one of said shaft parts; an outer sleeve having a bore in one end, the diameter of which corresponds to that of said shaft parts and an enlarged bore in the other end thereof; an inner sleeve telescoped within the end of said outer sleeve which has the enlarged bore, and overlapping the meeting ends of said shaft parts, said inner sleeve having a bore, the diameter of which corresponds to that of said shaft parts and both said inner and outer sleeves having complementary annular grooves which provide an annular groove conforming to said bead on one of the shaft parts; means for temporarily locking one end of said outer sleeve to one of said shaft parts, and a body of metal fused to the other end of said outer sleeve and to said inner sleeve and the other shaft part to permanently secure said sleeves to the other of said shaft parts, said outer sleeve having a thickened portion which conforms to the diameter of the shaft part contained therewithin and which co-operates with said annular bead to prevent the shaft parts from being withdrawn from each other.

FRANK WILSON, Sr.